United States Patent [19]

Sakashita et al.

[11] Patent Number: 4,975,214
[45] Date of Patent: Dec. 4, 1990

[54] MAGNETIC IRON OXIDE CONTAINING SILICON ELEMENT AND PROCESS FOR PRODUCING SAME

[75] Inventors: Kiichiro Sakashita, Inagi; Yasuo Iwahashi, Kashiwa, both of Japan

[73] Assignee: Canon Kabushiki Kaisha, Tokyo, Japan

[21] Appl. No.: 395,302

[22] Filed: Aug. 18, 1989

[30] Foreign Application Priority Data

May 28, 1986 [JP] Japan .................. 61-121181

[51] Int. Cl.$^5$ ............................................. C01G 49/00
[52] U.S. Cl. ............................. 252/62.59; 251/62.56; 423/326
[58] Field of Search ................. 252/62.59, 62.56; 423/632, 326

[56] References Cited

U.S. PATENT DOCUMENTS

| | | | |
|---|---|---|---|
| 4,113,658 | 9/1978 | Geus | 252/62.59 X |
| 4,309,459 | 1/1982 | Tokuoka | 252/62.59 X |
| 4,376,714 | 3/1963 | Pingand | 252/62.59 X |

FOREIGN PATENT DOCUMENTS

| | | | |
|---|---|---|---|
| 61-55509 | 12/1981 | Japan | 423/632 |
| 0161710 | 9/1983 | Japan | 423/632 |
| 0002226 | 1/1985 | Japan | 423/632 |
| 1106420 | 5/1986 | Japan | 423/632 |

Primary Examiner—William R. Dixon, Jr.
Assistant Examiner—James M. Hunter, Jr.
Attorney, Agent, or Firm—Fitzpatrick, Cella, Harper & Scinto

[57] ABSTRACT

Magnetic iron oxide containing silicon element is produced in the form of generally octahedral particles having a sharp particle size distribution through a reaction of an aqueous solution of a ferrous salt having a controlled Fe(II)/Fe(III) ratio and containing a silicic compound with a little excess of an alkali, followed by oxidation of the resultant ferrous hydroxide. The magnetic iron oxide particles have an overall content of silicon element of 0.1–1.5 wt. % based on the iron element with the silicon localized at the core of the particles. The magnetic iron oxide particles have uniform surface properties not markedly changed under various conditions and have good dispersibility in a resin.

23 Claims, 1 Drawing Sheet

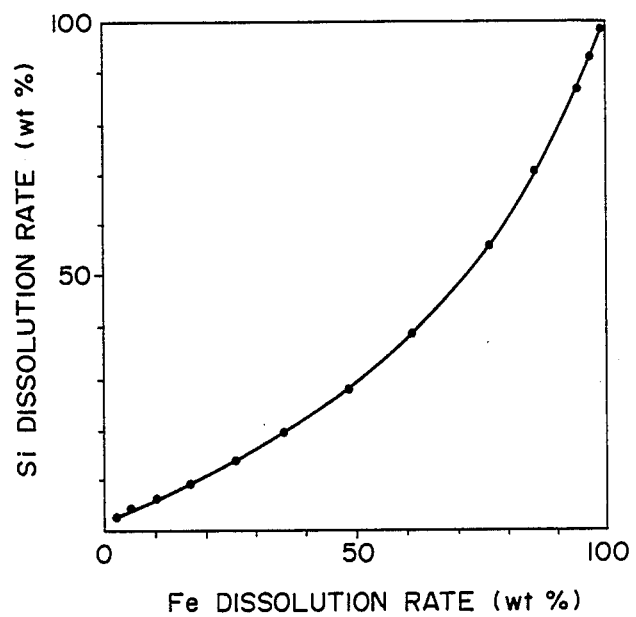

MAGNETIC IRON OXIDE CONTAINING SILICON ELEMENT AND PROCESS FOR PRODUCING SAME

FIELD OF THE INVENTION AND RELATED ART

The present invention relates to a magnetic iron oxide containing silicon element in the form of particles having a sharp particle size distribution and having an improved dispersibility, and a process for producing the same.

Recently, magnetic iron oxide produced through an aqueous solution reaction has been widely used as a magnetic material for a magnetic toner for use in a dry electrophotographic copier. A magnetic toner is required to satisfy a diversity of general developing characteristics, and is essentially required to show stable charging and developing characteristics under various temperature and humidity conditions as triboelectrification is utilized in an ordinary developing mechanism. Accordingly, the magnetic iron oxide constituting the magnetic toner itself is earnestly required to be improved in particle size distribution for facilitating the dispersion thereof in a resin, to have a uniform particle structure and to be improved in adaptability to various environments.

With respect to production of magnetic iron oxide through an aqueous solution reaction, various proposals have been made in respects of kinds of an alkali used for neutralization and the pH of a solution containing ferrous hydroxide after the neutralization. However, the thus produced magnetic iron oxide particles still leave a room for improvement in environmental characteristics.

As a method for improving magnetic iron oxide, addition of a constituent of a spinnel ferrite represented by a divalent metal is known. In addition thereto, there is also known a method of adding silicic acid, aluminum, phosphoric acid, etc., as proposed by Japanese Patent Laid-Open Appln. No. 2226/1983. Silicic acid as an additive has been known to show an effect of improving heat resistance by coating the particle surfaces (e.g., Japanese Patent Laid-Open Appln. No. 35697/1978. If it is used in a magnetic toner, however, a silicic acid component such as a silicate or silicic acid hydrate is liable to remarkably impair the moisture resistance.

Through the use of a mineral acid at a low concentration for quantitative evaluation of a silicic acid component contained at particle surfaces, it has now been found that not only the silicic acid component can be easily measured quantitatively but also the distribution of the silicic acid component can be measured (Mat. Res. Bull., Vol. 20, pp 85–92). A magnetic iron oxide produced through an aqueous solution reaction without intentional addition of silicic acid was evaluated by using the above technique. As a result, it was found that a considerable amount of silicic acid inevitably introduced from the ferrous salt, neutralizing agent and water for solution was detected from the particle surfaces with respect to a powder sample containing spherical particles obtained by using an amount of alkali below the equivalent amount.

The above mentioned Japanese Laid-Open Patent Appln. No. 2226/1983 has proposed a process wherein a silicic acid salt is added in advance as a third component to a ferrous salt solution, but in the process, the alkali in an amount below the equivalent is added. This is not desirable because it provides a product containing a silicic acid component in a large amount at the surfaces.

On the other hand, Japanese Patent Publication No. 28203/1980 has proposed a magnetic powder containing uniformly dispersed silicic acid obtained through addition of silicic acid or a silicic acid salt simultaneously with or into an alkali for neutralization. Japanese Patent Laid-Open Appln. No. 34070/1986 has proposed the addition of a silicic acid compound to ferrous hydroxide at a time when the reaction to magnetite has proceeded. These known processes are however insufficient in localizing the silicic acid component preferentially at the central portion of the particles and preventing the remaining at the surfaces.

SUMMARY OF THE INVENTION

An object of the present invention is to provide a magnetic iron oxide containing silicon element which has a narrow particle size distribution and little agglomerating characteristic, and a process for producing the same.

Another object of the present invention is to provide a magnetic iron oxide containing silicon element which has a uniform composition on the particle surface, and a process for producing the same.

Another object of the present invention is to provide a magnetic iron oxide containing silicon element, which is free from deterioration of electrical characteristics due to moisture absorption and has stable magnetic characteristic even under high temperature-high humidity conditions, and a process for producing the same.

A further object of the present invention is to provide a magnetic iron oxide containing silicon element, which has stable magnetic and electric characteristics without causing localization or accumulation of charges even under low temperature-low humidity conditions, and a process for producing the same.

A still further object of the present invention is to provide a magnetic iron oxide containing silicon element, which has a higher concentration of silicic acid component in the central portion of a particle, has a lower concentration of silicic acid component in the superficial portion of a particle, and has little silicic acid component remaining on the surface of a particle, and a process for producing the same.

According to a first aspect of the present invention there is provided a magnetic iron oxide containing silicon element, which satisfies the properties of: a content of silicon element of 0.1–1.5 wt. % based on the iron element; a content A (based on the iron element) of silicon element present up to about 10 wt. % dissolution of the iron element of 0.7 wt. % or less; a content B (based on the iron element) of silicon element present in the range of about 90 wt. %–100 wt. % dissolution of the iron element of 0.2–5 wt. %, and a ratio of the content B/the content A of above 1.0.

According to a second aspect of the present invention, there is provided a process for producing magnetic iron oxide containing silicon element, comprising: preparing an aqueous ferrous salt solution adjusted to have an Fe(II)/Fe(III) ratio in the range of 30–100; adding a silicic acid component into the adjusted ferrous salt solution; reacting the ferrous salt solution with an alkali in an amount exceeding the equivalent to form ferrous hydroxide; and oxidizing the ferrous hydroxide in the presence of the added silicic acid compound to form magnetic iron oxide particles so that silicon element originated from the silicic acid compound is contained inside the magnetic iron oxide particles.

These and other objects, features and advantages of the present invention will become more apparent upon a consideration of the following description of the preferred embodiments of the present invention taken in conjunction with the accompanying drawing.

BRIEF DESCRIPTION OF THE DRAWINGS

The sole figure in the drawing is a graph obtained by plotting data shown in Table 1 obtained by analysis of magnetic iron oxide containing silicon element produced in Example 1.

DETAILED DESCRIPTION OF THE INVENTION

The present invention provides a magnetic iron oxide in which the content of silicon element is 0.1–1.5 wt. %, preferably 0.20–1.0 wt. %, more preferably 0.25–0.70 wt. % based on the iron element. Less than 0.1 % is insufficient to provide improvements to particle characteristics desired by the present invention, and more than 1.5 wt. % increases the silicic acid component remaining on the particle surfaces.

The magnetic iron oxide according to the present invention has a content A (based on the iron element) of silicon element present up to about 10 wt. % dissolution of iron element of about 0.7 wt. % or less, preferably 0.01–0.5 wt. %, a content B (based on the iron element) of silicon element in the range of 90–100 wt. % dissolution of the iron element of 0.2–5 wt. %, preferably 0.5–3.0 wt. %. The content A of silicon element up to about 10 wt. % dissolution of iron element represents the content of silicon element in the very external or superficial portion of the magnetic iron oxide particles. If this value is above 0.7 wt. %, the surface composition of the magnetic iron oxide becomes ununiform or the moisture resistance is impaired by the silicic acid component, whereby there is an increased tendency that intended effect of the present invention is not fully exhibited. The content B of silicon element in the range of 90–100 wt. % dissolution of the iron element represents the content of silicon element at the central portion or core of the magnetic iron oxide particles. If this value is 5 less than 0.2 wt. %, the particle size distribution is not uniformized and it becomes difficult to uniformize the compositional distribution and structure of individual magnetic iron oxide particles. If it is more than 5 wt. %, the viscosity of a reaction liquid for production is increased, whereby not only the efficiency is impaired but also uniform reaction in the reaction vessel is hindered, thus resulting in individual magnetic iron oxide particles having different compositions.

The magnetic iron oxide according to the present invention has a ratio of the content B/content A is above 1.0, preferably 3–10. If the ratio is not above 1.0, the magnetic iron oxide nuclei formed at the initial stage of the magnetic iron oxide formation do not contain sufficient silicic acid component, so that it becomes difficult to produce magnetic iron oxide particles having uniform sizes and a sharp particle size distribution.

The magnetic iron oxide according to the present invention may preferably have an apparent bulk density of 0.10–0.25 g/cc. In this range, the particles are little agglomerating and primarily comprising octahedral particles, thus functioning as a magnetic iron oxide exhibiting the effects of the present invention more effectively.

The magnetic iron oxide according to the present invention is excellent in affinity to a resin or an organic solvent. For example, the dispersibility in toluene shows 4 mm or less in terms of a sedimentation length after 1 hour from the commencement of standing. The dispersibility in toluene may further preferably be 3 mm or less. When the above condition is satisfied, the magnetic iron oxide can be uniformly dispersed well in a polymeric resin component as is suitably be used in or as a magnetic recording material, a magnetic toner, and a pigment.

The magnetic iron oxide may preferably have a BET specific surface area by nitrogen adsorption of 0.5–20 $m^2/g$. If the specific surface area exceeds 20 $m^2/g$, there is an increased tendency for the magnetic iron oxide particles to agglomerate and have poor environmental characteristics. If the specific surface area is below 0.5 $m^2/g$, when the magnetic iron oxide is used by dispersing it in a film or fine particles, the magnetic iron oxide particles are liable to excessively protrude over the surfaces of or be localized in the film or the fine particles. Further, the specific surface area in more preferably in the range of 4–20 $m^2/g$. In this range, the magnetic iron oxide particles are caused to have a stable dispersibility in a film or fine particles and provide an excellent black color in respect of hue.

The magnetic iron oxide according to the present invention may preferably have an average particle size of 0.1–2.0 microns, further preferably 0.1–0.6 micron.

The methods for measurement of various physical property data used in defining the present invention will be described hereinbelow.

The content of silicon element (based on the iron element) in the magnetic iron oxide and the dissolution rate of iron element may be obtained in the following manner. For example, about 3 lit. deionized water is charged in a 5 lit.-beaker by using a 1 lit.messcylinder and warmed at 45°–50° C. on a water bath. A slurry of about 25 g of magnetic iron oxide in about 400 ml of deionized water (hereinafter, deionized water is used unless otherwise noted specifically) is added to the 5 lit.-beaker while washing it with about 328 ml of deionized water. Then, the system is held at a temperature of about 50 ° C., stirred at a speed of 200 rpm and about 1272 ml of a reagent-grade hydrochloric acid is added to start the dissolution. At this time, the magnetic iron oxide concentration is about 5 g/l and the aqueous hydrochloric acid solution has a concentration of about 3 normal. From the initiation of the dissolution until the complete dissolution to provide a clear solution, a 20 ml-sample is taken from the system for each 10 minutes to be filtered through a 0.1 micron-membrane filter to recover a filtrate. The filtrate is subjected to the inductively coupled plasma analysis (ICP) to determine the iron element and the silicon element.

The iron element dissolution rate (%) is calculated as:
[the iron element concentration in a sample (mg/l)/the iron element concentration in complete dissolution (mg/l)] ×100.

The content of silicon element (%) for each sample is calculated as:
[the silicon element concentration (mg/l)/the iron element concentration (mg/l)] ×100.

The apparent bulk density of magnetic iron oxide is measured in the following manner. A bulk density measuring apparatus of Powder Tester (Hosokawa Micron K. K.) is used with a 710 micron-sieve, a disintegrated sample of magnetic iron oxide is charged little by little onto the sieve under vibration at an amplitude of about 1 mm. The sieving is continued until the sieved sample is heaped up in an attached cup of 100 cc. The top of the cup is leveled with a blade. The sample magnetic iron oxide weight is measured by subtracting the empty cup weight and the apparent density (g/cc) is calculated as:

Sample magnetic iron oxide weight (g)/100 (cc).

The dispersibility of magnetic iron oxide in toluene is evaluated in the following manner. A sample of about 1 g is weighed and charged in a precipitation tube (16.5 mm dia. ×105 mm height, with a scale) with a fit plug, and toluene is charged to make 10 ml. The plug is fit, the tube is sufficiently stirred and is placed vertically for standing. Simultaneously with the commencement of the standing, a stopwatch is pushed, and a difference in height between the liquid level and the precipitation boundary. The difference value is used as a measure for evaluating the dispersibility in toluene of the magnetic iron oxide sample.

The average particle size and shape of magnetic iron oxide is measured or observed in the following manner. A sample is treated with a collodion film copper mesh and observed through a transmission electron microscope (H-700H, mfd. by Hitachi Seisakusho K. K.) at a voltage of 100 KV and a magnification of 10,000. A picture is taken at a printing magnification of 3 to provide an ultimate magnification of 30,000. From the picture, the shape of individual particles is observed, and the maximum lengths of the respective particles are measured to provide an average particle size by an average of the measured values.

As a result of examination of various methods of adding a silicic acid compound in order to improve the production of magnetic iron oxide through an aqueous solution reaction, a process as mentioned above capable of producing a magnetic iron oxide containing silicon element in a preferable state has now been developed, in which process a ferrous salt solution is adjusted to have an Fe(II)/Fe(III) ratio of 30–100, preferably 40–60, and a silicic acid compound is added to the solution. The solution is then neutralized with the equivalent amount or more of an alkali to obtain ferrous hydroxide, which is then oxidized to produce an magnetic iron oxide containing silicon element. The magnetic iron oxide thus formed has been found to contain only a small amount of silicic acid component remaining on the surface and to be particles which contain silicic acid component localized in the center, have a uniform particle size distribution and are excellent in dispersibility.

According to observation through a transmission electron microscope, the magnetic iron oxide particles containing silicon element are found to comprise primarily octahedral particles and to be almost free of spherical particles.

More specifically, in the production process according to the present invention, an aqueous solution of a ferrous salt such as ferrous sulfate is neutralized with an aqueous solution of an alkali in an amount exceeding the equivalent amount, and the resultant aqueous solution containing ferrous hydroxide is subjected to oxidation by aeration at a temperature of 60° C. or higher, preferably 75°–95° C. At this time, a silicic acid compound in an amount of 0.1–1.5 wt. % in terms of Si/Fe is added prior to or in the initial stage of the oxidation, whereby a magnetic iron oxide with excellent particle size distribution and with an enhanced dispersibility in a binder resin. The magnetic iron oxide thus formed is then subjected to removal of salts, and dried at 100°–150° C. to be obtained in a powder with a uniform particles shape.

The size of the resultant magnetic iron oxide particles may be easily controlled by the ratio of Fe(II)/Fe(III) in the ferrous salt solution.

In the process of producing a magnetic iron oxide by neutralizing a ferrous salt solution with an alkali in an amount exceeding the equivalent amount to produce a slurry of ferrous hydroxide and oxidizing the ferrous hydroxide, it is preferred that the ferrous hydroxide slurry has a pH of 9.0 or above. Below pH 9.0, the magnetic iron oxide particles produced tend to contain those having shapes other than octahedron in a large amount. On the other hand, if the alkali is added too much, the particle size distribution is liable to be broadened. Accordingly, in order to produce octahedral particles in a large proportion while retaining a sharp particle size distribution, it is preferred that the ferrous hydroxide slurry may have a pH of 9 or above, particularly 10 or above and the alkali may be used in an amount not exceeding 1.1 times, preferably 1.05 times, the equivalent of the ferrous salt. More specifically, the excessive alkali concentration in the solution after the neutralization of the ferrous salt with the alkali may preferably be 0.25 mol/l or below, particularly 0.125 mol/l or below.

With respect to the amount of the silicic acid compound to be added, less than 0.1 wt. % does not show a sufficient improvement effect on the particle characteristics as desired by the present invention, and more than 1.5 wt. % is not desirable because the silicic acid component remains increasingly on the particle surface.

The silicic acid compound to be added may for example be commercially available silicates such as sodium silicate or silicic acid in the form of a sol formed by hydrolysis. Aluminum sulfate, alumina or another additive can be added as far as it does not provide an ill effect to the present invention.

As the ferrous salt, iron sulfate by-produced in titanium production by the sulfuric acid process or iron sulfate by produced in washing of steel sheets may generally be used, and it is also possible to use iron chloride.

In the production of magnetic iron oxide by the aqueous solution process, the iron concentration of 0.5–2.6 mol/l is generally used in order to prevent the increase in viscosity at the time of reaction and in view of the solubility of iron sulfate. There is generally a tendency that a lower iron sulfate concentration provides a smaller particle size of the product. In the reaction, a large amount of air for oxidation or a lower reaction temperature tends to provide smaller particles.

The magnetic iron oxide according to the present invention may be suitably applicable to various uses such as a magnetic recording material, a pigment and a magnetic toner. For example, the magnetic iron oxide is extremely effectively used as a magnetic material for providing a magnetic toner for electrophotography. Particularly, it is suitable used for providing a positively chargeable toner. A magnetic toner may be fine powder comprising magnetic powder and optionally an additional dye or pigment dispersed in a binder resin of a natural or synthetic resin. In the conventional magnetic toner, however, being affected by changes in environmental conditions for copying, the triboelectric charge of toner particles are liable to become unstable, to provide copied images which are low in density or cause lowering in density. There is a tendency that the dispersion of the magnetic powder in the binder resin is insufficient and the magnetic property and the chargeability change widely among individual toner particles, so that fogging and deterioration of images are caused. Further, fogging and lower density are liable to be caused also because individual magnetic particles have ununiform surface properties. We have had a knowledge that a magnetic toner obtained by using the magnetic iron oxide according to the present invention may well dissolve the above problems.

A magnetic toner provided in this manner comprises at least a binder resin and the magnetic iron oxide. The binder resin may be a known binder resin for a toner, such as a styrene resin, and a polyester resin, for example. The magnetic iron oxide according to the present invention may be used in a proportion of 20-200 wt. parts, preferably 30-150 wt. parts, per 100 wt. parts of the binder resin.

The magnetic iron oxide according to the invention may preferably be treated with a silane coupling agent, a titanium coupling agent, a titanate, an aminosilane, a hydrophobic polymer material or a surface active agent. Treatment with isopropyl triisostearoyl titanate (TTS) or aluminum stearate is particularly preferred.

while maintaining the temperature at 85° C. to complete the reaction in 5.5 hours. Then, the solid in the slurry was washed and dried to obtain a magnetic iron oxide containing silicon element. The content of the silicon element in the magnetic iron oxide was measured to be 0.72 wt. % based on the iron element.

With respect to the magnetic iron oxide thus obtained, the content A of silicon element up to about 10 % dissolution of iron element was 0.43 wt. %, the content B of silicon element in the range of 90-100 wt. % dissolution of iron element was 1.58 wt. %, and the content ratio B/A was about 3.7. The apparent bulk density was 0.22 g/cc, the dispersibility in toluene was 1 mm in terms of sedimentation length in 1 hour, and the BET specific surface area was 8.1 $m^2/g$. As a result of the observation and measurement through a transmission electron microscope, the magnetic iron oxide showed an average diameter of 0.25 micron, was substantially free of spherical particles and most particles have the shape of a an octahedron.

The dissolved iron element and silicon element measured at each ten minutes are given in the following Table 1, and the calculation of the contents A and B will be explained.

TABLE 1

| | | Dissolution time (min) | | | | | | | | | | | | | |
|---|---|---|---|---|---|---|---|---|---|---|---|---|---|---|---|
| | | 10 | 20 | 30 | 40 | 50 | 60 | 70 | 80 | 90 | 100 | 110 | 120 | 130 | 140 | 150 |
| Iron dissolved | mg/l | 80 | 170 | 340 | 550 | 840 | 1150 | 1570 | 1970 | 2460 | 2750 | 3040 | 3110 | 3200 | 3220 | 3220 |
| Iron dissolved | wt. % | 2.48 | 5.28 | 10.6 | 17.1 | 26.1 | 35.7 | 48.8 | 61.2 | 76.4 | 85.4 | 94.4 | 96.6 | 99.4 | 100 | 100 |
| Silicon dissolved | mg/l | 0.67 | 0.98 | 1.47 | 2.16 | 3.17 | 4.47 | 6.54 | 8.95 | 12.9 | 16.3 | 20.0 | 21.4 | 22.8 | 23.0 | 23.1 |
| Silicon dissolved | wt. % | 2.90 | 4.24 | 6.36 | 9.35 | 13.7 | 19.3 | 28.3 | 38.7 | 55.8 | 70.6 | 86.6 | 92.6 | 98.7 | 99.6 | 100 |

By such a treatment, it is possible to further improve the environmental characteristics and dispersibility and also adjust the chargeability.

In the case of a magnetic material treated with an agent containing silicon element such as a silane coupling agent, the overall content, content A and content B of silicon element defining the magnetic iron oxide used in the invention are obtained by removing the amount of silicon element originating from the treating agent.

Hereinbelow, the present invention will be explained by way of examples, wherein "parts" are by weight unless otherwise noted specifically.

Example 1

53 kg of ferrous sulfate for industrial use ($FeSO_4$ $7H_2O$, iron content: about 19 %) was dissolved in 50 lit. of water and the solution was warmed with steam to form a solution maintained at 40° C. and having an iron concentration of 2.4 mol/l. Air was blown into the solution to adjust the Fe(II)/Fe(III) ratio to 50. Then, 560 g of sodium silicate having an SiO content of 28 % (corresponding to 156.8 g of SiO) was dissolved in 13 lit. of water to form a solution, which was then adjusted with respect to pH and added to the above ferrous sulfate solution.

13.2 kg of caustic soda was dissolved in 50 lit. of water, and the solution was used for neutralization of about 80 lit. of the ferrous sulfate solution containing silicic acid component under mechanical stirring. The excessive caustic soda in the ferrous sulfate slurry was adjusted to a concentration of 2 g/l by using caustic soda. Air was blown at a rate of 37 l/min into the slurry The measured data shown in Table 1 gave a graph shown in FIG. 1 wherein the measured data are plotted with the abscissa of dissolution rate of iron element (wt. %) and the ordinate of dissolution rate of silicon element. From the graph, the dissolution rate of silicon element is read at the 10 % dissolution of iron element, and then the dissolved amount of silicon element is obtained. Separately, the dissolved amount of iron element at the 10 % dissolution of iron element is obtained. By using these data, the content A is calculated by the following equation:

Content $A$ = [dissolved amount of silicon element at 10% dissolution of iron element (mg/l)/dissolved amount of iron element at 10 wt. % dissolution of iron element] $\times$ 100
    = [23.1 $\times$ 0.06/3220 $\times$ 0.1] $\times$ 100
    = 0.43 wt. %

From the graph, the dissolved amount of silicon element and dissolved amount of iron element in the range of 90 wt. % -100 wt. % dissolution of iron element are respectively obtained by subtracting the respective values at the 90 wt. % dissolution from the respective values at the 100 wt. % dissolution, and the content B is calculated by using these data as follows:

Content $B$ = [dissolved amount of silicon element in the range of 90 wt. %-100 wt. % dissolution of iron element/ dissolved amount of iron element in the range of 90 wt. %-100 wt. % dissolution of iron element] $\times$ 100
    = [23.1 $\times$ 0.22/3220 $\times$ 0.1] $\times$ 100

= 1.58 wt. %

Examples 2-4

The procedure of Example 1 was repeated by changing the Fe(II)/Fe(III) ratio, the amount of addition of sodium silicate, and the remaining caustic soda concentration at the time of neutralization, respectively, as shown in Table 2 appearing hereinafter, whereby magnetic iron oxide products having properties satisfying the requirements of the present invention as also shown in Table 2 were obtained.

Magnetic Toner Production Example 1

Styrene/2-ethylhexyl acrylate/divinyl benzene copolymer (copolymerization wt. ratio: 80/15/5, weight-average molecular weight: 380,000): 100 wt. parts
Nigrosine: 4 wt. parts
Low-molecular weight polypropylene: 4 wt. parts
Magnetic iron oxide of Example 1: 60

The above ingredients were well blended in a blender and melt-kneaded at 160° C. by means of a roll mill. The kneaded product was cooled, coarsely crushed by a hammer mill, finely pulverized by means of a pulverizer using jet air stream, and classified by a wind-force classifier to obtain a black powder having a volume-average particle size of about 11 microns.

To 100 wt. parts of the black powder was added 0.5 wt. part of a positively chargeable hydrophobic colloidal silica treated with an aminomodified silicone oil, followed by blending by means of a Henschel mixer to obtain a toner. The toner was used for image formation in a commercially available copier (NP3525, mfd. by Canon K. K.), whereby an image having a high density of 1.29, free of fog and a high resolution was obtained under normal temperature and normal humidity conditions. Further, under low temperature low humidity (15° C., 10 %) conditions and high temperature-high humidity (35° C., 85 %) conditions, image densities of 1.30 and 1.28 were obtained with little difference in image density. When the toner was subjected to repetitive copying operation, the image density was stable, and there was observed no problematic fog or reversal fog in a white erased portion when a region-specifying function was utilized.

Comparative Example 1

The procedure of Example 4 was repeated except that the sodium silicate aqueous solution was not added to obtain a magnetic iron oxide. The magnetic iron oxide obtained showed the content of silicon element based on the iron element of 0.02 wt. %.

The magnetic iron oxide showed fractionally dissolved silicon contents (A and B) of about 0.03 wt. % respectively up to 10 wt. % dissolution and in the range of 90–100 wt. % dissolution of iron element; and the silicon element was considered to have been introduced from water and the like.

The resultant magnetic iron oxide showed an apparent bulk density of 0.32 g/cc, a dispersibility in toluene in terms of sedimentation length in 1 hour of 7 mm, a BET specific surface area of 6 $m^2$/g, and an average particle size of 0.35 micron by observation and measurement by a transmission electron microscope.

A toner was prepared and evaluated in the same manner as in the above Magnetic Toner Production Example 1 except that the magnetic iron oxide of Comparative Example 1 was substituted for the magnetic iron oxide of Production Example 1.

Under normal temperature and normal humidity conditions, slight noticeable fog was observed compared with the result in the above Toner Production Example 1. Under the low temperature-low humidity conditions, the fog was more noticeable and the image density was lowered during the 30,000 sheets of repetitive copying from 1.26 at the initial stage of 1.09. Under the high temperature-high humidity conditions, the image density was lower from the outset than the above Toner Production Example 1.

Comparative Example 2

The procedure of Example 3 was repeated except that the oxidation was conducted under an acidic condition of pH 6.4–7.4. The properties of the product magnetic iron oxide are shown in the following Table 2 together with those of the above Examples and Comparative Example 1.

TABLE 2

| | Production conditions | | | Physical properties of magnetic iron oxide | | | | | | |
|---|---|---|---|---|---|---|---|---|---|---|
| | Fe (II)/ Fe (III) | Sodium silicate Si/$Fe_3O_4$ (%) | Neutralization conditions | Content A (wt. %) | Content B (wt. %) | B/A | Bulk density (g/cc) | Dispersibility in toluene (mm) | Specific surface area ($m^2$/g) | Overall content of Si element (%) |
| Prod. Ex. 1 | 50 | 0.5 | NaOH$_2$ g/l | 0.43 | 1.58 | 3.7 | 0.22 | 1 | 8.1 | 0.72 |
| Prod. Ex. 2 | 60 | 0.4 | NaOH$_2$ g/l | 0.28 | 1.23 | 4.4 | 0.19 | 0 | 8.0 | 0.56 |
| Prod. Ex. 3 | 80 | 0.3 | NaOH$_2$ g/l | 0.36 | 1.07 | 3.0 | 0.22 | 1 | 8.8 | 0.44 |
| Prod. Ex. 4 | 100 | 0.2 | NaOH$_2$ g/l | 0.37 | 0.68 | 1.8 | 0.19 | 1 | 10.6 | 0.31 |
| Comp. Prod. Ex. 1 | 100 | 0 | NaOH$_2$ g/l | — | — | — | 0.32 | 7 | 6.0 | — |
| Comp. Prod. Ex. 2 | 80 | 0.3 | pH 6.4–7.4 | 2.51 | 0.26 | 0.10 | 0.48 | 34 | 11.5 | 0.44 |

What is claimed is:

1. A magnetic iron oxide comprising octahedral particles having a BET specific surface area by nitrogen adsorption of 0.5–20 $m^2$/g, and comprising iron oxide and silicon element, which satisfies the following properties:

a content of silicon element of 0.1–1.5 wt. % based on the iron content;

a content A of silicon element present up to about 10 wt. % dissolution of the iron element of 0.7 wt. % or less;

a content B of silicon element present in the range of about 90–100 wt. % dissolution of the iron content of 0.2–5 wt. %; and a ratio of B/A being above 1:0.

2. A magnetic iron oxide according to claim 1, which has an average particle size of 0.1–2.0 microns.

3. A magnetic iron oxide according to claim 2, which has an average particle size of 0.1–0.6 micron.

4. A magnetic iron oxide according to claim 1, which has an average particle size of 0.1–0.6 micron.

5. A magnetic iron oxide according to claim 4, which has a BET specific surface area by nitrogen adsorption of 4–20 m²/g.

6. A magnetic iron oxide according to claim 1, which has a content of silicon element of 0.2–1.0 wt. % based on the iron element.

7. A magnetic iron oxide according to claim 6, which has a content A of silicon element of 0.25–0.7 wt. % based on the iron content.

8. A magnetic iron oxide according to claim 1, which has a content A of silicon element as defined of 0.1–0.5 wt. %.

9. A magnetic iron oxide according to claim 1, which has a content B of silicon element as defined of 0.5–3 wt. %.

10. A magnetic iron oxide according to claim 1, which has an apparent bulk density of 0.10–0.25 g/cc.

11. A magnetic iron oxide according to claim 1, which has a dispersibility in toluene of 4 mm or less in terms of a sedimentation length after standing for 1 hour.

12. A process for producing magnetic iron oxide comprising octahedral particles having a BET specific surface area by nitrogen adsorption of 0.5–20 m²/g, said process comprising the steps of:

preparing a ferrous salt solution adjusted to have an Fe(II)/Fe(III) ratio in the range of 30–100;

adding a silicic acid component into the adjusted ferrous salt solution;

reacting the ferrous salt solution with an alkali in an amount exceeding the equivalent to form ferrous hydroxide; and oxidizing the ferrous hydroxide in the presence of the added silicic acid compound in an aqueous solution of pH 9.0 or above to form magnetic oxide particles so that the silicon element which originated from the silicic acid compound is contained inside the magnetic iron oxide particles.

13. A process according to claim 12, wherein the Fe(II)/Fe(III) ratio of the ferrous salt solution is adjusted to a value in the range of 40–60.

14. A process according to claim 12, wherein the silicic acid compound is sodium silicate or silicic acid sol.

15. A process according to claim 14, wherein the silicic acid is added to provide an Si/Fe ratio of 0.1–1.5 wt. % in the ferrous salt solution.

16. A process according to claim 12, wherein the ferrous hydroxide is oxidized in an aqueous solution at a temperature of 60° C. or higher.

17. A process according to claim 16, wherein the ferrous hydroxide is oxidized in an aqueous solution at a temperature of 75°–95° C.

18. A process according to claim 12, wherein the ferrous hydroxide is oxidized in an aqueous solution of pH 9.0 or above.

19. A process according to claim 12, wherein the alkali in an amount of exceeding the equivalent and not exceeding 1.1 times the equivalent of the ferrous salt is reacted with the ferrous salt.

20. A process according to claim 12, wherein the alkali is used in an amount to provide an excessive concentration thereof of 0.25 mol/l or less in the resultant ferrous oxide slurry.

21. A process according to claim 12, wherein the ferrous salt comprises ferrous sulfate.

22. A process according to claim 12, wherein the ferrous salt comprises ferrous chloride.

23. A process according to claim 12, wherein the alkali comprises sodium hydroxide.

* * * * *

UNITED STATES PATENT AND TRADEMARK OFFICE
CERTIFICATE OF CORRECTION

PATENT NO. : 4,975,214

DATED : December 4, 1990

INVENTOR(S) : KIICHIRO SAKASHITA ET AL.     Page 1 of 2

It is certified that error appears in the above-identified patent and that said Letters Patent is hereby corrected as shown below:

ON THE TITLE PAGE:

IN [56] REFERENCES CITED

FOREIGN PATENT DOCUMENTS, "0002226 1/1985 Japan" should read --0002226 1/1983 Japan--.

IN [63] RELATED U.S. APPLICATION DATA

Insert "Continuation of Ser. No. 054,448, May 27, 1987, abandoned."

COLUMN 1

Line 5, insert---continuation of Ser.No. 054,448, filed 5/27/97, abandoned--.
Line 30, "respects" should read --respect--; and
Line 37, "spinnel" should read --spinel--.

COLUMN 3

Line 10, "DRAWINGS" should read --DRAWING--; and
    Line 47, "5" should be deleted.

COLUMN 4

Line 24, "in" should read --is--.

COLUMN 6

Line 59, "suitable" should read --suitably--.

UNITED STATES PATENT AND TRADEMARK OFFICE
CERTIFICATE OF CORRECTION

PATENT NO. : 4,975,214

DATED : December 4, 1990

INVENTOR(S) : KIICHIRO SAKASHITA ET AL.

It is certified that error appears in the above-identified patent and that said Letters Patent is hereby corrected as shown below:

<u>COLUMN 9</u>

Line 21, "60" should read --60 wt. parts--.

Signed and Sealed this

Fourth Day of August, 1998

Attest:

*Attesting Officer*

BRUCE LEHMAN

*Commissioner of Patents and Trademarks*